Patented Nov. 15, 1938

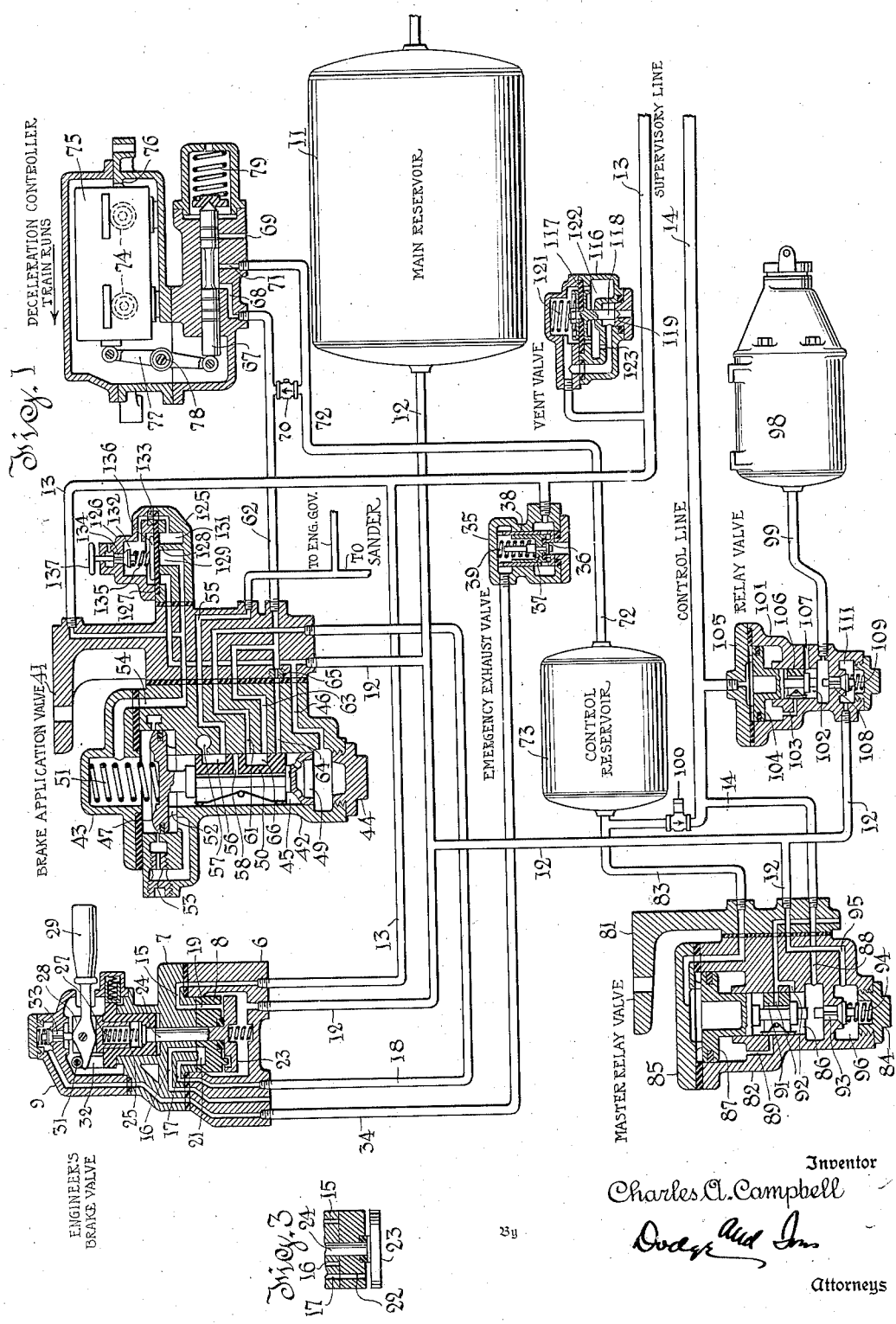

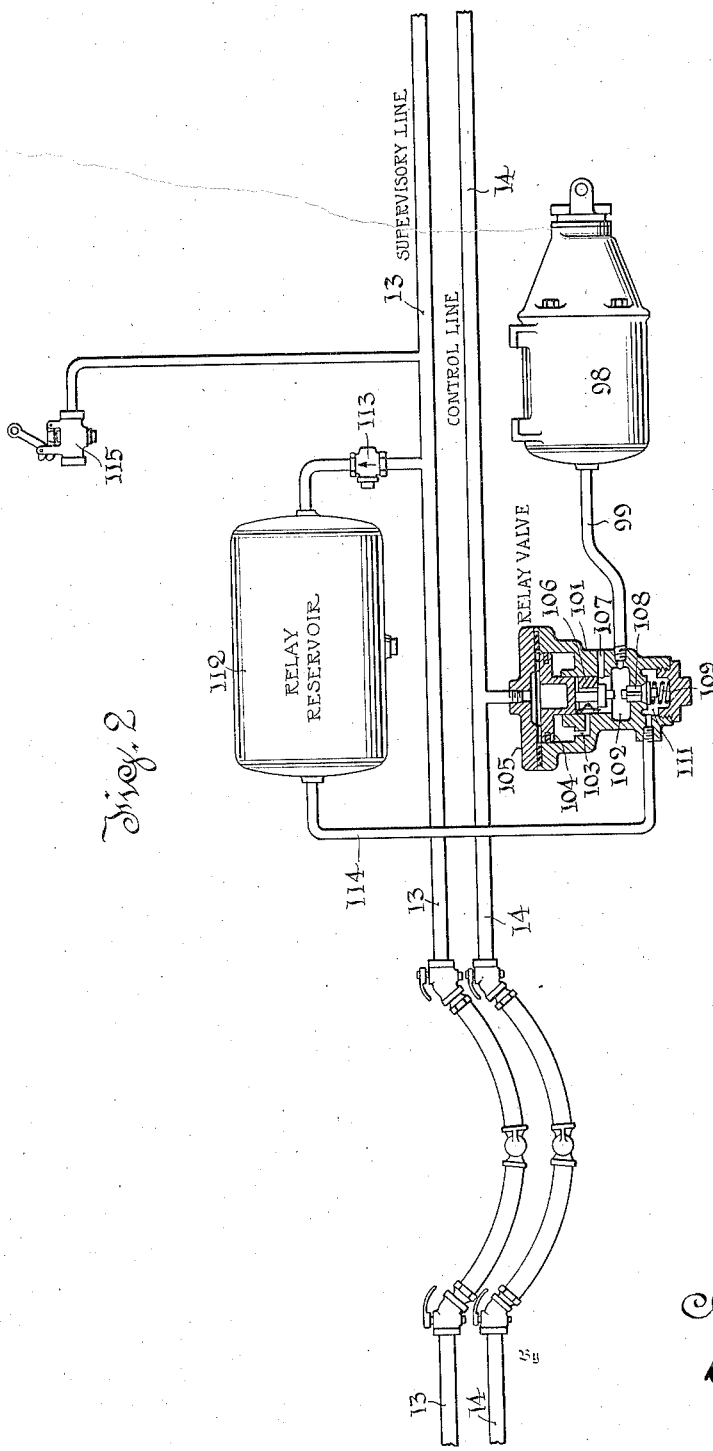

2,136,575

UNITED STATES PATENT OFFICE 2,136,575

FLUID PRESSURE BRAKE

Charles A. Campbell, Watertown, N. Y., assignor to The New York Air Brake Company, a corporation of New Jersey Application May 19, 1934, Serial No. 724,987

37 Claims. (Cl. 303—24)

This invention relates to air brakes, and particularly to straight air systems having a control pipe, hereinafter called the control line, and a reservoir pipe, hereinafter called the supervisory line, extending throughout the length of the train.

An important object of the invention is to provide means associated with the supervisory line for controlling the connection of the supervisory line and the main reservoir, and functioning to interrupt such connection and cause an application of the brakes if the pressure in the supervisory line be sharply reduced. This makes it possible to insure application of the brakes on the train, regardless of the position of the engineer's brake valve, if the supervisory line is ruptured, or if air is rapidly vented therefrom by secondary means, such as a conductor's valve, a deadman valve, or the like.

The means associated with the supervisory line, and just mentioned, take the form of an automatic valve mechanism, hereinafter called the brake application valve. The brake application valve responds to the existence of a substantial differential of pressure between the main reservoir and the supervisory line, and controls the operative connection between the engineer's brake valve and the control means, in such a way that when the supervisory line pressure is sharply reduced, the brake application valve disconnects the engineer's brake valve from its operative relation with the control line and itself reacts upon the control line to insure a brake application, the air for such application preferably being furnished on the locomotive by the main reservoir and on each trailing vehicle by a corresponding relay reservoir charged through a non-return valve from the supervisory line.

The mechanism described and claimed in the present application was developed for the control of very high speed trains in which short stopping distances are essential to permit the train to be controlled by block signal systems in which the blocks are no longer than those now customarily used.

To produce this result a regulatory mechanism, responsive to the deceleration of the train by the brakes, is used to control the braking pressure by regulating the pressure developed in the control line. This regulatory mechanism is interposed between the brake application valve and the control line, so that it controls brake applications made by the application valve, as well as those made by the engineer's brake valve.

While air might be supplied to and exhausted from the control line through the regulatory mechanism above outlined, better action is secured by establishing a control pressure in a control reservoir and causing this pressure to control the action of a master relay valve which, in response to pressure changes in the control reservoir, either supplies air from the main reservoir directly to the control line or exhausts the control line to atmosphere, so as to cause control line pressure to conform to pressure in the control reservoir. By using a control reservoir of moderate volume, it becomes possible to use an engineer's brake valve, a brake application valve, and a deceleration controller, all characterized by the use of small ports, short valve travel, and consequently small overall dimensions. The master relay valve can be given port sizes adequate for extremely rapid regulatory action upon the control line.

The effect of using the master relay valve is merely to insure rapid response of control line pressure without requiring the use of regulatory valve mechanism of abnormal size. From the broad operative standpoint, however, it is recognized that indirect or relay control, and direct control omitting the relay, are substantially equivalent so far as the broad aspects of the present invention are concerned.

Control of brake cylinder pressure is effected by secondary relay valves which respond to changes of pressure in the control line to admit and exhaust air to and from corresponding brake cylinders.

On each trailing vehicle a relay reservoir is used and this reservoir is charged through a check valve from the supervisory line, so that in case of rupture of the supervisory line a source of compressed air will still be available on each trailing vehicle. Since the brake application valve protects the main reservoir from loss of air should the supervisory line be ruptured, it is practicable to derive air for the leading brake unit directly from the main reservoir. Such an arrangement is illustrated, but there is nothing in the operative principles of the device which would preclude the use of relay reservoirs for each brake cylinder, should that for any reason be considered desirable.

The preferred embodiment of the invention is illustrated in the accompanying drawings, in which,—

Fig. 1 is a diagrammatic view, partly in elevation and partly in section, showing the essential elements of the equipment for the leading car, or locomotive.

Fig. 2 is a similar view showing the equipment for one of the trailing cars with its connection to the leading car or locomotive.

Fig. 3 is a fragmentary diagram similar to a portion of Fig. 1 showing the rotary valve of the engineer's brake valve in application position.

Figs. 1 and 2, considered together, show the system for the leading car and one trailing car. It should be understood that any suitable number of additional similarly equipped trailing cars may be connected in a train for unit brake operation, by connecting the supervisory line and control line from car to car, in the usual manner.

The sections showing various parts of the apparatus are diagrammatic to the extent that ports are drawn as if they all lay in a single plane, this being a familiar convention, permitting various flows to be traced from a single figure. It is not necessary that the ports should be so located, and compactness can be secured by modifying locations according to principles well understood in the art.

Referring first to Fig. 1, the engineer's brake valve comprises a pipe bracket portion 6 to which all pipe connections are made, a seat portion 7 on the lower face of which is the inverted seat for the rotary valve 8, and a bonnet or housing 9 which encloses the deadman handle mechanism.

The main reservoir appears at 11 and the main reservoir pipe and all branches thereof in free communication therewith are indicated by the numeral 12.

Similarly the supervisory line with its freely communicating branches are indicated by the numeral 13 and the control line and freely communicating branches by the numeral 14.

The bracket 6 is connected to the main reservoir pipe 12, which supplies main reservoir air to the chamber in which the rotary valve 8 is mounted. Supervisory line 13 is connected to bracket 6 and thence to a port 15 in the seat of rotary valve 8. Also in the seat for rotary valve 8 are an atmospheric exhaust port 16, and a port 17, which may be called the "control port" because it is the port which normally exercises control on the control pipe, through the brake application valve, deceleration controller, and master relay. A pipe 18 connected to bracket 6 communicates with the control port 17.

In release position, shown in Fig. 1, a port 19 through the rotary valve 8, admits main reservoir air to supervisory line port 15 and a cavity 21 connects control port 17 with exhaust port 16.

In lap position ports 15, 16 and 17 are blanked. In service position a through port 22 (see Fig. 3) admits main reservoir air to control port 17, ports 15 and 16 being blanked.

The valve 8 is turned by head 23 on stem 24 which is fast in hub 25. The hub is engaged by the impositive detent which defines the valve positions. Swiveled in hub 25 and urged upward by compression spring 27 is a forked yoke 28. The deadman handle 29 is inserted between the branches of yoke 28 and its inner end engages under lug 31 and between spaced lugs 32 all carried by hub 25, thus locking yoke 28 and hub 25 together, and permitting the handle to operate the valve. The handle must be held down against the urge of spring 27, else it will unseat the poppet vent valve 33 and vent line 34.

The deadman valve above described involves patentably novel features, but as these are inventions independent of the control system here under discussion, they are not claimed in the present application.

The vent line 34 is connected to the body 35 of an emergency exhaust valve connected to vent the supervisory line 13 if valve 33 be unseated. In body 35 is a seat 36 controlling an atmospheric port and a combined piston and valve 37 which coacts with seat 36 and is loosely fitted in bushing 38. A spring 39 urges piston-valve 37 in a closing direction. If valve 33 be closed pipe 34 becomes charged by leakage past the piston during charging of pipe 13 and spring 39 holds the valve closed. Opening of valve 33 vents pipe 34 so that valve 37 opens and vents pipe 13. The consequent venting of the supervisory line causes a brake application as will be explained.

The brake application valve is carried in a ported bracket 41, to which all pipe connections are made, and comprise a body 42, front cap 43 and plug 44 as the enclosing structure. The body encloses a slide valve chamber 45 with which the reservoir line 12 directly communicates through a port 46. In chamber 45 is a seat for slide valve 50. Communicating with chamber 45 is a cylinder which receives piston 47. The piston 47 has a stem with spaced shoulders which embrace slide valve 50 and cause it to partake of the movements of the piston. A spider 49 guides the piston stem. A coil compression spring 51 reacts between the front cap and the piston, forcing this inward (downward) to a normal position defined by stand-off lugs 52 on the inner side of the piston.

In the normal position so defined, a charging bypass around the piston from chamber 45 to the space within the front cap is afforded through choke fittings 53, interchangeable to permit adjustment of flow capacity. The space within the front cap is connected by way of port 54 with supervisory line 13. Thus under normal conditions line 13 is charged through choke 53 from the main reservoir. This charging connection is cut off, when piston 48 moves outward and seats against the front cap gasket.

A port 55 in the seat of slide valve 50 is indicated by legends to be connected with accessory apparatus such as a sander and an engine governor for the car propelling engine. In normal position of the slide valve port 55 is vented to atmosphere by way of cavity 56 and exhaust port 57, but in the outer position of the slide valve 50 a through port 58 admits main reservoir air to port 55 to operate the sander and change the loading of the engine governor.

Pipe 18 which communicates with control port 17 of the engineer's brake valve leads to a port 61 in the seat of slide valve 50. A pipe 62 leads from two ports 63 and 64 in the seat of slide valve 50. A choke 65 is interposed in port 64. When the slide valve 50 is in the normal position a cavity 66 connects ports 61 and 63 and port 64 is blanked. When the piston moves outward, ports 61 and 63 are disconnected and port 64 is exposed so that main reservoir air flows to pipe 62 at a rate controlled by the size of choke 65.

The pipe 62 leads to the device which responds to deceleration. This comprises a balanced piston valve 67 working in a valve chamber having a port 68 to which pipe 62 is connected, an atmospheric exhaust port 69 and between the two a port 71 connected by pipe 72 with control reservoir 73 (though pipe 72 might be connected directly with control pipe 14 as suggested).

The direction of motion of the train (here assumed to be a single end unit) is indicated by the arrow on Fig. 1, and guided on rollers 74, to move in a line parallel to such motion is an inertia mass 75 whose normal (rear) position is defined by stop 76. Mass 75 reacts through lever 77, fulcrumed at 78, upon the valve 67 in opposition to an initially stressed coil compression spring 79 at the rear end of the valve.

No means for adjusting the stress on spring 79 is illustrated, but nothing in the present invention would preclude the use of adjusting means known in the art, some of which are covered by copending applications of the present applicant.

Deceleration of the train at rates produced by application of the brakes causes mass 75 to move forward shifting valve 67. The ports 68 and 69 are so spaced relatively to the reduced middle portion of valve 67, that as the valve is shifted from the normal position in which it connects ports 68 and 71 and blanks port 69, it first assumes a position in which it blanks ports 68 and 69, and then on slight further motion, assumes a position in which it connects ports 69 and 71 and blanks port 68. The action of the valve obviously is progressive or graduating, and the lap in ports 68 and 69 is slight, so that the action of the valve is quite refined. A bypass check valve 70 permits release of the brakes by the engineer's brake valve when valve 67 blanks port 68.

Details of the structure of the deceleration controller involve independent inventions and hence are not claimed in the present application.

Between control reservoir 73 and control pipe 14 a master relay valve of large flow capacity is interposed. A bypass check valve 100 loaded to open when pressure in the control reservoir 73 is eight pounds per square inch or more above pressure in control line 14, assures an application should the master relay valve be sluggish in action, and also permits an application should the main reservoir supply line to the master relay be ruptured.

A bracket 81 supports the body 82 and to it are connected the supervisory line 12, the control line 14 and pipe 83 leading from control reservoir 73. The body 82 has a plug closure 84 at its lower end and a cap 85 at its upper end, and encloses a slide valve chamber 86 and a cylinder in which works the relay piston 87. The chamber 86 is in free communication with control pipe 14 by way of port 88, and with the space below piston 87 by restricted port 89, the stem of the piston being enlarged adjacent the piston to fit chamber 86 freely and thus exercise a moderate damping effect on the piston's movements.

The piston actuates an exhaust slide valve 91 of the grid type controlling simultaneously two exhaust ports 92 leading from chamber 86 to atmosphere. The ports 92 are wide open when piston 87 is in its outer (upper) position. As the piston moves inward (downward) valve 91 first closes ports 92, after which the stem engages poppet inlet valve 93 and unseats it against the urge of compression spring 94. This admits main reservoir air by way of main reservoir pipe 12, port 95 and chamber 96 to chamber 86 which, as stated, is connected with the control pipe 14.

Each vehicle in the train has at least one braking unit (one per car being illustrated) and these units are identical except as to their sources of brake-applying air and may be identical as to these.

Such units comprise brake cylinders 98 each connected by a pipe 99 with the body 101 of a corresponding relay application valve structurally similar to the master relay valve.

The relay application valves are identical and are constructed as follows: The pipe 99 communicates with a slide valve chamber 102, which communicates by port 103 with the space below piston 104. The space at the other side of piston 104 and between it and cap 105 is in direct communication with the control line 14. The piston 104 has a stem part of which fits freely in chamber 102 and has an extension straddling and confining an exhaust slide valve 106 which controls an atmospheric exhaust port 107, open when the piston is in its outer (upper) position.

As the piston moves downward it shifts valve 106 to close exhaust port 107 and then engages valve 108 to unseat the same against the urge of compression spring 109, thus admitting pressure fluid from chamber 111 to chamber 102 and consequently to brake cylinder 98.

On the leading car chamber 111 may be connected directly with main reservoir pipe 12 as shown. On trailers it is necessary to provide a stored volume of pressure fluid sufficient to apply the brake, even though the supervisory line should be vented, as it is under certain circumstances.

For this reason each trailer carries a relay reservoir 112 charged from the supervisory line 13 through a check valve or other suitable non-return valve 113. Each such reservoir is connected by a pipe 114 with the chamber 111 of the corresponding relay application valve. Such a reservoir and check valve might obviously be interposed between pipe 12 and chamber 111 of the relay on the leading car, but this is obviously unnecessary.

A conductor's valve 115 is used on each trailer, or wherever desirable, and when manually opened serves to vent the supervisory line 13 to which it is connected.

To accelerate complete venting, when initiated by the conductor's valve 115 or emergency exhaust valve 35, or any other means, a large capacity vent valve, whose body is indicated at 116, is connected to supervisory line 13. Vent valve 116 is located as close to the brake application valve as is conveniently practicable, so that it will cause piston 47 to respond despite any feeding flow through choke fitting 53.

The body 116 is made in two parts, between which is clamped a flexible diaphragm 117. The diaphragm actuates a pin valve 118 coacting with seat 119 to control an atmospheric vent port leading from the supervisory line. The diaphragm is urged in a valve-closing direction by supervisory line pressure and by a coil compression spring 121. It is subject in the opposite direction to pressure in a chamber 122, charged from the supervisory line through a restricted opening 123. Slow reductions of supervisory line pressure obviously do not affect the diaphragm sufficiently to open the vent valve because of back flow through port 123, but a sudden pressure reduction will cause the vent valve to open wide.

With the system as so far described, if the supervisory line is vented, the shifting of the brake application valve will preclude restoration of supervisory line pressure save by flow through port 19 of the engineer's brake valve. This is a relatively slow operation and hence delays release after applications produced by the depletion of supervisory line pressure—for example, conductor's valve applications and deadman valve applications.

To permit rapid release after such applications auxiliary means, called the bypass valve, are provided to ensure a direct feed from the main reservoir to the supervisory line. The bypass valve may be variously located so long as it is readily accessible for operation by the engineer, but since the engineer's brake valve and the application valve are closely associated it is convenient to locate the bypass valve on bracket 41, and desirable to do so because this brings the bypass valve close to the space within cap 43 above piston 47. Thus piston 47 shifts immediately in response to opening of the bypass valve.

The bypass valve is made up of a body 125 bolted to bracket 41 and a cap 126 bolted to the body. Between cap 126 and body 125 is clamped a flexible diaphragm 127 which also serves as a valve by coaction with an annular seat rib 128 on body 125. When the diaphragm seats on rib 128 it isolates from each other a central chamber 129 connected through a branch of port 54 with the supervisory line 13 and a surrounding annular chamber 131 connected by a branch of port 46 with main reservoir pipe 12. The chamber 132 within cap 126 and above diaphragm 127 is charged from chamber 131 through choke 133. Atmospheric vent valve 134 is urged closed by pressure in the space above the diaphragm and also by a spring 135 which reacts between the valve and a thrust plate 136 resting upon the diaphragm 127. A push button 137 is provided to permit manual unseating of vent valve 134.

Opening of valve 134 by striking button 137 vents chamber 132 at a rate greatly exceeding charging flow through choke 133, so that diaphragm 127 lifts, connecting chambers 129 and 131. This causes piston 47 to move downward under the urge of spring 51 assisted by pressure fluid admitted by the lifting of diaphragm 127. Once piston 47 has shifted, charging flow through choke 53 maintains sufficient pressure above the piston to hold it down.

When the train is running the control line 14 is at atmospheric pressure and the supervisory line 13 is at main reservoir pressure. The relay reservoirs 112 are charged to or substantially to main reservoir pressure. The deceleration controller is in its inactive position, shown in Fig. 1, the brake application valve is in its normal position, shown in Fig. 1, and the engineer's brake valve is in release position, also shown in Fig. 1.

To make an application of the brakes, the engineer moves his brake valve handle to application position, shifting the rotary valve to the position shown in Fig. 3, in which main reservoir air is admitted to the port 17 and consequently to the control pipe 18. Since the brake application valve is in normal position the pipe 18 is connected directly to the pipe 62 and thence through the deceleration controller valve to pipe 72, so that the engineer's brake valve functions initially to establish a pressure in the control reservoir 73, and this pressure operates through the master relay valve to establish quickly a similar pressure in the control line 14. The pressure in the control line 14 causes the secondary relay valves to function and establish a similar pressure in the brake cylinders.

If the resulting brake application is heavy enough to cause the deceleration controller weight 75 to shift against the resistance of the spring 79, the effect will be to blank the port 68 in the deceleration controller valve and vent air from the control reservoir through the atmospheric port 69.

From the above it is obvious that the deceleration controller takes entire control and functions gradually to reduce the pressure in the control reservoir 73 at a rate which will maintain the deceleration of the train substantially constant. This will occur even if the engineer's brake valve be shifted to lap position from application position, for the reason that the brakes must be gradually released if a uniform rate of deceleration is to be maintained. After the train comes to rest the deceleration controller moves to its normal position and places the engineer's valve again in control to release the brakes.

The brake application valve functions to produce an application of the brakes if the supervisory line be vented and when performing this function the brake application valve disconnects the engineer's brake valve from controlling relation with the system.

Venting of the supervisory line may be caused in a number of ways, by rupture of the line, by opening the conductor's valve 115 with the attendant opening of the emergency vent valve 117, or by deadman action initiated by release of the handle 29 and the consequent opening of the deadman valve 33, which causes the emergency exhaust valve in body 35 to open.

Regardless of the cause of the venting of the supervisory line 13, the brake application valve shifts until its piston 47 seals on the front cap gasket. This blanks the feed port 53 and prevents the main reservoir charge from being lost through the supervisory line. At the same time exhaust connection of port 55 is interrupted and main reservoir air is admitted to this port through port 58, thus operating the sanders and performing a special regulatory function on the governor of the propelling engine.

This particular function may be variously modified and its details are not a factor in the present invention, beyond the fact that pressure fluid may be admitted automatically to the governor through the brake application valve to perform some regulatory function. At the same time the engineer's brake valve is disconnected because cavity 66 ceases to connect the ports 61 and 63.

Motion of the brake application valve admits main reservoir air directly to the port 64 and this air flows under control of the choke 65 to pipe 62 and thence under control of the deceleration controller valve 67 to the control reservoir 73. The effect is immediately to produce a heavy application, and as soon as the deceleration rate rises to a point at which the deceleration controller weight 75 responds, the deceleration controller takes control of the pressure in the reservoir 73 and modulates this pressure to insure a uniform deceleration rate until the train comes to rest.

After the vent from the supervisory line 13 has been closed the brakes can be released by the engineer's brake valve in release position, but since the feed through the port 19 is slow, this would take an unduly long time except in standing releases. For running releases, quick release may be effected by depressing button 137 which causes the equalizing valve diaphragm to rise and open a quick feeding connection from the main reservoir to the supervisory line. The local equalization of pressure permits spring 51 to shift piston 49 to its lower position, in which it is maintained thereafter by feeding flow through the port 53. In this way the supervisory line is quickly fed and the brake application valve is restored to its normal position of Fig. 1.

From the above it will be seen that two means are provided to effect an application, namely, a manually operated means, which is the engineer's brake valve, and automatic means responsive to supervisory line pressure, namely, the brake application valve. The engineer's brake valve is normally connected in controlling relation with the system by the brake application valve, and such connection is interrupted by the response of the brake application valve to the venting of the supervisory line. In either case the deceleration controller takes control of the intensity of the application, it being understood that this applies to applications made by the engineer's brake only when such applications are of sufficient intensity to establish the desired deceleration rate.

The present application is directed primarily to the controlling mechanism, that is, to the application valve and the deceleration controller, and the engineer's brake valve, individually, or in various combinations. As explained, this may exert control directly on control line pressure, but, preferably, and as shown, exerts it indirectly through an interposed control reservoir and master relay. To simplify the disclosure, the secondary relay valves attached to the control line are shown as of a very simple form and consequently are of a type which can function only if the control line and the master relay be fully operative. The invention is not, however, limited to use with the simple secondary relay valves herein disclosed.

In certain of the claims the term "graduating" will be used as descriptive of the modulating valve to distinguish from that type of valve which is either fully open or fully closed.

What is claimed is,—

1. In a fluid pressure brake system, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced below pressure of said source; and a normally closed bypass valve independently operable to establish a connection of larger capacity than said charge-controlling means between said source and said line.

2. In a fluid pressure brake system, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressure of said source; a normally closed bypass valve independently operable to establish a connection of larger capacity than said charge-controlling means between said source and said line; a brake valve; a control line; and valve means actuated by said abutment and controlling an operative connection between said brake valve and said control line.

3. In a fluid pressure brake system, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressre of said source; a brake valve; a control line; valve means actuated by said abutment and controlling an operative connection between said brake valve and said control line; and pressure modulating valve means responsive to the rate of deceleration produced by a brake application, and interposed between the last-named valve means and the control line.

4. In a fluid pressure brake system, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressure of said source; a normally closed bypass valve independently operable to establish a connection of larger capacity than said charge-controlling means between said source and said line; a brake valve; a control line; valve means actuated by said abutment and controlling an operative connection between said brake valve and said control line; and pressure modulating valve means, responsive to the rate of deceleration produced by a brake application, and interposed in the last-named connection.

5. In a fluid pressure brake system, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source and responsive to motion of said abutment to interrupt such charging when supervisory line pressure is reduced materially below pressure of said source; a brake valve; a control line; valve means actuated by said abutment and controlling an operative connection between said brake valve and said control line; pressure modulating valve means of the graduating admission and exhaust type, interposed in the last-named connection; and means responsive to the rate of deceleration produced by a brake application and connected to actuate said pressure modulating valve means.

6. In a fluid pressure brake system, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressure of said source; a normally closed bypass valve independently operable to establish a connection of larger capacity than said charge-controlling means between said source and said line; a brake valve; a control line; valve means actuated by said abutment and controlling an operative connection between said brake valve and said control line; pressure modulating valve means of the graduating admission and exhaust type interposed between the last-named valve means and the control line; and means responsive to the rate of deceleration produced by a brake application and connected to actuate said pressure modulating valve means.

7. In a fluid pressure brake, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressure of said source; a normally closed bypass valve independently operable to establish a connection of larger capacity than said charge-controlling means between said source and said line; a brake valve; a deadman valve arranged to cause venting of said supervisory line; a control line; and valve means actuated by said abutment and serving when the supervisory line is charged to connect the brake valve in controlling relation with the control line, and when the supervisory line is vented to interrupt such connection and establish a brake applying pressure in the control line.

8. In a fluid pressure brake system, the combination of a source of pressure fluid; a normally charged supervisory line which supplies pressure fluid for brake application; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressure of said source; a brake valve; a deadman valve arranged to cause venting of said supervisory line; a control line; valve means actuated by said abutment and serving when the supervisory line is charged to connect the brake valve in controlling relation with the control line, and when the supervisory line is vented to interrupt such connection and establish a brake applying pressure in the control line; pressure modulating valve means of the graduating type arranged to control the pressure in said control line; and means responsive to the rate of deceleration produced by a brake application, connected to actuate said modulating valve means.

9. In a fluid pressure brake, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressure of said source; a normally closed bypass valve independently operable to establish a connection of larger capacity than said charge-controlling means between said source and said line; a brake valve; a deadman valve arranged to cause venting of said supervosory line; a control line; valve means actuated by said abutment and serving when the supervisory line is charged to connect the brake valve in controlling relation with the control line, and when the supervisory line is vented to interrupt such connection and establish a brake applying pressure in the control line; pressure modulating valve means of the graduating type arranged to control the pressure in said control line; and means responsive to the rate of deceleration produced by a brake application, connected to actuate said modulating valve means.

10. The combination of a source of pressure fluid; a supervisory line; a control line; an engineer's brake valve, an application valve and a pressure modulating valve of the admission and exhaust type interposed in series with each other between said source and the control line, said engineer's brake valve being manually operable alternatively to permit fluid from said source to flow toward said line, or to arrest said flow and open a vent, said application valve being shiftable between alternative positions, in one of which it connects said engineer's brake valve with said modulating valve and in the other of which it interrupts said connection and supplies fluid from said source directly to said modulating valve, and said modulating valve having alternative positions in which it connects the control line selectively with said application valve and with atmosphere; an abutment interposed between said source and supervisory line and arranged to actuate said application valve and control charging of said line from said source; means for biasing said abutment to assist supervisory line pressure in its reaction thereon; means responsive to the rate of deceleration produced by a brake application, connected to actuate said modulating valve; and at least one relay valve responsive to control line pressure, to regulate the supply of braking pressure.

11. The combination of a source of pressure fluid; a supervisory line; a control line; an engineer's brake valve, an application valve and a pressure modulating valve of the admission and exhaust type interposed in series with each other between said source and the control line, said engineer's brake valve being manually operable alternatively to permit fluid from said source to flow toward said line, or to arrest said flow and open a vent, said application valve being shiftable between alternative positions, in one of which it connects said engineer's brake valve with said modulating valve and in the other of which it interrupts said connection and supplies fluid from said source directly to said modulating valve, and said modulating valve having alternative positions in which it connects the control line selectively with said application valve and with atmosphere; an abutment interposed between said source and supervisory line and arranged to actuate said application valve and control charging of said line from said source; means for biasing said abutment to assist supervisory line pressure in its reaction thereon; means responsive to the rate of deceleration produced by a brake application, connected to actuate said modulating valve; at least one local reservoir charged from the supervisory line; and a relay valve associated with said reservoir to derive braking pressure therefrom, said relay valve being subject to control by control line pressure.

12. The combination of a source of pressure fluid; a supervisory line; a control line; an engineer's brake valve, an application valve and a pressure modulating valve of the admission and exhaust type interposed in series with each other between said source and the control line, said engineer's brake valve being manually operable alternatively to permit fluid from said source to flow toward said line, or to arrest said flow and open a vent, said application valve being shiftable between alternative positions, in one of which it connects said engineer's brake valve with said modulating valve and in the other of which it interrupts said connection and supplies fluid from said source directly to said modulating valve, and said modulating valve having alternative positions in which it connects the control line selectively with said application valve and with atmosphere; an abutment interposed between said source and supervisory line and arranged to actuate said application valve and control charging of said line from said source; means for biasing said abutment to assist supervisory line pressure in its reaction thereon; means responsive to the rate of deceleration produced by a brake application, connected to actuate said modulating valve; at least one local reservoir charged from the supervisory line; a relay valve associated with said reservoir to derive braking pressure therefrom, said relay valve being subject to control by control line pressure; and means for venting rapidly the supervisory line.

13. The combination of a source of pressure fluid; a supervisory line; a control line; an engineer's brake valve, an application valve and a pressure modulating valve of the admission and exhaust type interposed in series with each other between said source and the control line, said engineer's brake valve being manually operable alternatively to permit fluid from said source to flow toward said line, or to arrest said flow and open a vent, said application valve being shiftable between alternative positions, in one of which it connects said engineer's brake valve with said modulating valve and in the other of which it interrupts said connection and supplies fluid from said source directly to said modulating valve, and said modulating valve having alternative positions in which it connects the control line selectively with said application valve and with atmosphere; an abutment interposed between said source and supervisory line and arranged to actuate said application valve and control charging of said line from said source; means for biasing said abutment to assist supervisory line pressure in its reaction thereon; means responsive to the rate of deceleration produced by a brake application, connected to actuate said modulating valve; at least one local reservoir charged from the supervisory line; a relay valve associated with said reservoir to derive braking pressure therefrom, said relay valve being subject to control by control line pressure; means for venting rapidly the supervisory line; and normally inactive independently operable means for establishing a pressure equalizing connection between said source and supervisory line adjacent the actuating abutment of the application valve.

14. In a fluid pressure brake system, the combination of a source of pressure fluid; a normally charged supervisory line which supplies pressure fluid for brake applications; a control line; relay valves connected with said control line to respond to pressure therein, and connected with the supervisory line to derive brake applying pressure therefrom; a movable abutment interposed between said source of fluid and said supervisory line and controlling the charging of the latter from the former; an application valve actuated by said abutment and controlling a connection through which control line pressure is regulated; graduating valve means responsive to the rate of deceleration interposed between said connection and the control line; and a brake valve operable selectively to a position in which it connects said connection with said source, and to a position in which it isolates said connection from said source and vents said connection.

15. In a fluid pressure brake system, the combination of a source of pressure fluid; a normally charged supervisory line which supplies pressure fluid for brake applications; a control line; relay valves connected with said control line to respond to pressure therein, and connected with the supervisory line to derive brake applying pressure therefrom; a movable abutment interposed between said source of fluid and said supervisory line and controlling the charging of the latter from the former; an application valve actuated by said abutment and controlling a connection through which control line pressure is regulated; graduating valve means responsive to the rate of deceleration interposed between said connection and the control line; a brake valve operable selectively to three positions, in one of which it connects said source with said connection, in another of which it isolates said connection from said source, and in the other of which it ioslates said connection from said source and vents said connection.

16. The combination defined in claim 14, in which the graduating valve means responsive to deceleration is of the admission and exhaust type.

17. The combination defined in claim 15, in which the graduating valve means responsive to deceleration is of the admission and exhaust type.

18. In a fluid pressure brake system, the combination of a source of pressure fluid; a normally charged supervisory line which supplies the pressure fluid for brake applications; a control line; relay valves connected with said control line to respond to pressure therein, and connected with the supervisory line to derive brake applying pressure fluid therefrom; a movable abutment interposed between said source of fluid and the supervisory line and controlling the charging of the latter from the former; an application valve actuated by said abutment and controlling a connection through which control line pressure is regulated; and a brake valve connected through said controlled connection to regulate pressure in the control line, said application valve having two positions, in one of which the feed connection to the supervisory line is open and the brake valve is connected to control pressure in the control line, and in the other of which the feed connection is closed, the controlling connection between the brake valve and control line is interrupted, and a pressure fluid supplying connection from said source is opened.

19. In a fluid pressure brake system, the combination of an engineer's brake valve; a device to and from which said brake valve admits and exhausts pressure fluid to apply and release the brakes; a modulating valve of the admission and exhaust type interposed between said brake valve and said device said modulating valve opening admission and exhaust ports selectively; means responsive to deceleration produced by a brake application for actuating said modulating valve; and check valve means for permitting exhaust flow from said device to the brake valve when the modulating valve is in position to disconnect the brake valve from said device.

20. In a fluid pressure brake system, the combination of an engineer's brake valve; a device to and from which said brake valve admits and exhausts pressure fluid to apply and release the brakes; a modulating valve interposed between said brake valve and said device and having three positions, in the first of which it connects said brake valve and device and closes an exhaust from the device, in the second of which it disconnects said brake valve and device and closes said exhaust, and in the third of which it disconnects said brake valve and device and opens said exhaust; means responsive to deceleration produced by a brake application for actuating said modulating valve; and check valve means for permitting flow from said device to the brake valve when said modulating valve is in said second and third positions.

21. In a fluid pressure brake system, the combination of a source of pressure fluid; a normally charged supervisory line which supplies pressure fluid for brake applications; a movable abutment interposed between said source and said line; biasing means acting on said abutment to assist supervisory line pressure; means controlling charging of said line from said source, and responsive to motion of said abutment to interrupt such charging when supervisory line pressure is reduced materially below pressure of said source; a brake valve; a control line; valve means actuated by said abutment and controlling an operative connection between said brake valve and said control line; and pressure modulating valve means responsive to the rate of deceleration produced by a brake application, and interposed in the last-named connection.

22. The method of controlling a fluid pressure brake system of the type in which the brakes are applied and released by varying the fluid pressure in a train pipe, said method comprising, regulating train pipe pressure in response to variations of pressure on a confined fluid; subjecting said confined fluid to a pressure such as will cause a brake application heavier than that permissible at low train speed; and thereafter modulating the pressure on such confined fluid in relation to deceleration produced by the brake application.

23. In a fluid pressure brake system, the combination of a train pipe; at least one fluid pressure braking unit connected with the train pipe and arranged to be actuated by variations of fluid pressure in said pipe; a reservoir; means responsive to pressure in said reservoir for controlling the pressure in said pipe; manually operable valve means for establishing desired pressures in said reservoir; and valve means responsive to the deceleration produced by an application of the brakes for controlling the pressure in said reservoir.

24. In a fluid pressure brake system, the combination of a train pipe; at least one fluid pressure braking unit connected with the train pipe and arranged to be actuated by variations of fluid pressure in said pipe; a reservoir; means responsive to pressure in said reservoir for controlling the pressure in said pipe; manually operable valve means for establishing desired pressures in said reservoir; and valve means having an admission and exhaust action and arranged to respond in accordance with the rate of deceleration produced by an application of the brakes for varying the pressure in said reservoir.

25. In a fluid pressure brake, in combination, a straight air pipe, a brake cylinder, a relay valve device operated by fluid under pressure supplied to the straight air pipe for supplying fluid under pressure to the brake cylinder, a brake valve device, means controlled by said brake valve device for supplying fluid under pressure to said straight air pipe, a brake pipe, and a valve device operated upon a reduction in brake pipe pressure for also supplying fluid under pressure to said straight air pipe.

26. In a fluid pressure brake system, in combination, a brake pipe, a brake application pipe, means operated upon an increase in fluid pressure in said brake application pipe for effecting an application of the brakes, a brake valve device for supplying fluid under pressure to said brake application pipe, valve means operated by an increase in fluid pressure for also supplying fluid under pressure to said brake application pipe, and an emergency valve device operated upon a reduction in brake pipe pressure for supplying fluid under pressure to operate said valve means.

27. In a fluid pressure brake system, in combination, a brake pipe, a valve device for controlling a communication through which fluid under pressure is supplied to the brake pipe and operated upon a reduction in fluid pressure for cutting off said communication and for venting fluid under pressure from the brake pipe, and safety control means operative upon release by an operator for venting fluid under pressure from said valve device.

28. In a fluid pressure brake system, in combination, a brake cylinder, a brake pipe normally charged with fluid under pressure, means operated upon a reduction in brake pipe pressure for effecting a supply of fluid under pressure to said brake cylinder, a main reservoir, means for establishing a communication from said main reservoir to said brake pipe, a valve device in said communication operable to disconnect said brake pipe from said reservoir and to effect a reduction in brake pipe pressure, and safety control means for controlling operation of said valve device.

29. In a fluid pressure braking system, in combination, a brake cylinder, a supply reservoir, a control reservoir, a relay valve device operative by an increase in fluid pressure for supplying fluid under pressure from the supply reservoir to the brake cylinder, and valve means for supplying fluid under pressure from the control reservoir to the relay valve device.

30. In a fluid pressure brake system, in combination, a straight air pipe adapted to have fluid under pressure supplied thereto to effect an application of the brakes, a first valve device operable upon a supply of fluid under pressure thereto to effect a supply of fluid under pressure to said straight air pipe, a second valve device operable upon a release of fluid under pressure therefrom for effecting a supply of fluid under pressure to operate said first valve device, a pipe normally charged with fluid under pressure, and a third valve device operated upon a reduction of pressure in said normally charged pipe for effecting a release of fluid under pressure from said second valve device.

31. In a fluid pressure brake system, in combination, a valve device operated upon a supply of fluid under pressure thereto to open a communication through which fluid under pressure is supplied to effect an application of the brakes, a connection for controlling power supplied to the vehicle driving motors, a slide valve shiftable from a biased position to an application position to effect a supply of fluid under pressure to said valve device and to said connection, a pipe normally charged with fluid under pressure, and means operated upon a reduction of pressure in said pipe for shifting said slide valve to said application position.

32. In a fluid pressure brake system, in combination, a valve device operated upon a supply of fluid under pressure thereto to effect an application of the brakes, a valve shiftable from a release position to an application position to supply fluid under pressure to said valve device, a safety control pipe, a brake pipe, and means operated upon a reduction of pressure in either of said pipes for shifting said valve to said application position.

33. In a vehicle brake system, in combination, a brake cylinder, a relay valve device for controlling the supply of fluid under pressure to and its release from said brake cylinder, means for establishing a communication through which fluid under pressure is supplied to operate the relay valve device, a second valve device operable to close said communication to a supply of fluid under pressure, means for controlling operation of said second valve device, a brake valve device, and means for releasing fluid under pressure from the relay valve device by operation of said brake valve device when said communication is closed to said supply.

34. In a train brake system, the combination with a brake cylinder, of a valve device operated upon an increase in pressure for effecting a supply of fluid under pressure to said brake cylinder, means for establishing a communication through which fluid under pressure is supplied to operate said valve device, means for effecting a graduated supply of fluid under pressure through said communication, a normally charged pipe, a second valve device operated upon a decrease of pressure in said pipe for closing said communication to said graduated supply and for connecting said communication to an ungraduated source of supply, and means operated according to the rate of retardation of the train for subsequently closing said communication to said ungraduated supply.

35. In a vehicle brake system, in combination, a brake cylinder, a relay valve device for controlling the supply of fluid under pressure to and its release from said brake cylinder, means for establishing a communication through which fluid under pressure is supplied to operate the relay valve device, a second valve device operable to close said communication to a supply of fluid under pressure, means for controlling operation of said second valve device, a brake valve device, and means for releasing fluid under pressure from the relay valve device by operation of said brake valve device when said communication is closed to said supply.

36. In a two pipe straight air system, the combination of an air supply; a brake pipe; a straight air pipe; an engineer's brake valve for controlling pressure in the straight air pipe; and means normally effective to charge the brake pipe and responsive to a sudden reduction of pressure to suspend the supply of air to the brake pipe, isolate the brake valve from the straight air pipe, and supply air to the straight air pipe independently of the brake valve.

37. In a railway train brake apparatus, the combination with a plurality of brake cylinders and a straight air pipe, of a plurality of control valve devices operable to supply fluid under pressure to said brake cylinders and straight air pipe, self-lapping brake control means operable to control operation of said control valve devices and to supply fluid under pressure to said straight air pipe, and means responsive to fluid pressure in said straight air pipe supplied by said control valve devices for causing said brake control means to effect a lapping of the supply to said brake cylinders.

CHARLES A. CAMPBELL.